United States Patent [19]

Bouda

[11] Patent Number: 4,858,498
[45] Date of Patent: Aug. 22, 1989

[54] AUTOMATIC TRANSMISSION SYSTEM FOR A VEHICLE

[75] Inventor: Keiji Bouda, Hiroshima, Japan

[73] Assignee: Mazda Motor Corporation, Hiroshima, Japan

[21] Appl. No.: 925,245

[22] Filed: Oct. 30, 1986

[30] Foreign Application Priority Data

Oct. 31, 1985 [JP] Japan ............................ 60-244837

[51] Int. Cl.$^4$ ............................................. B60K 41/10
[52] U.S. Cl. ........................................ 74/866; 74/878
[58] Field of Search ................. 74/861, 864, 865, 866, 74/878; 364/424.1

[56] References Cited

U.S. PATENT DOCUMENTS

| 3,665,779 | 5/1972 | Mori ....................................... 74/866 |
| 3,805,640 | 4/1974 | Schneider et al. ................. 74/866 X |
| 3,885,447 | 5/1975 | Braun et al. ..................... 74/752 A X |
| 4,111,072 | 9/1978 | Harmon et al. ................... 74/867 X |
| 4,198,882 | 4/1980 | Kiencke et al. ........................ 74/866 |
| 4,208,929 | 6/1980 | Heino et al. ....................... 74/866 X |
| 4,414,863 | 11/1983 | Heino ................................ 74/878 X |
| 4,467,427 | 8/1984 | Magnusson ........................ 74/866 X |
| 4,495,576 | 1/1985 | Ito ..................................... 74/866 X |
| 4,499,793 | 2/1985 | Jow et al. .............................. 74/864 |
| 4,573,375 | 3/1986 | Hamada et al. ................... 74/866 X |
| 4,669,335 | 6/1987 | Matsuoka et al. ..................... 74/866 |
| 4,693,142 | 9/1987 | Kurihara et al. ...................... 74/861 |

FOREIGN PATENT DOCUMENTS

| 3201440 | 9/1983 | Fed. Rep. of Germany ........ 74/866 |
| 48-210 | 1/1973 | Japan . |
| 56-156543 | 12/1981 | Japan . |
| 2090926 | 7/1982 | United Kingdom ................. 74/861 |

Primary Examiner—Leslie A. Braun
Assistant Examiner—Harold F. Macris
Attorney, Agent, or Firm—Fleit, Jacobson, Cohn, Price, Holman & Stern

[57] ABSTRACT

A control system for automatic transmissions having a multiple stage transmission gear mechanism in which shift control is accomplished based on an automatic shift control mode or a holding mode wherein a higher gear stage is selected under the holding mode and when a predetermined driving condition is detected, a shift down control is carried out so as to obtain a desirable feeling in a reacceleration operation.

7 Claims, 5 Drawing Sheets

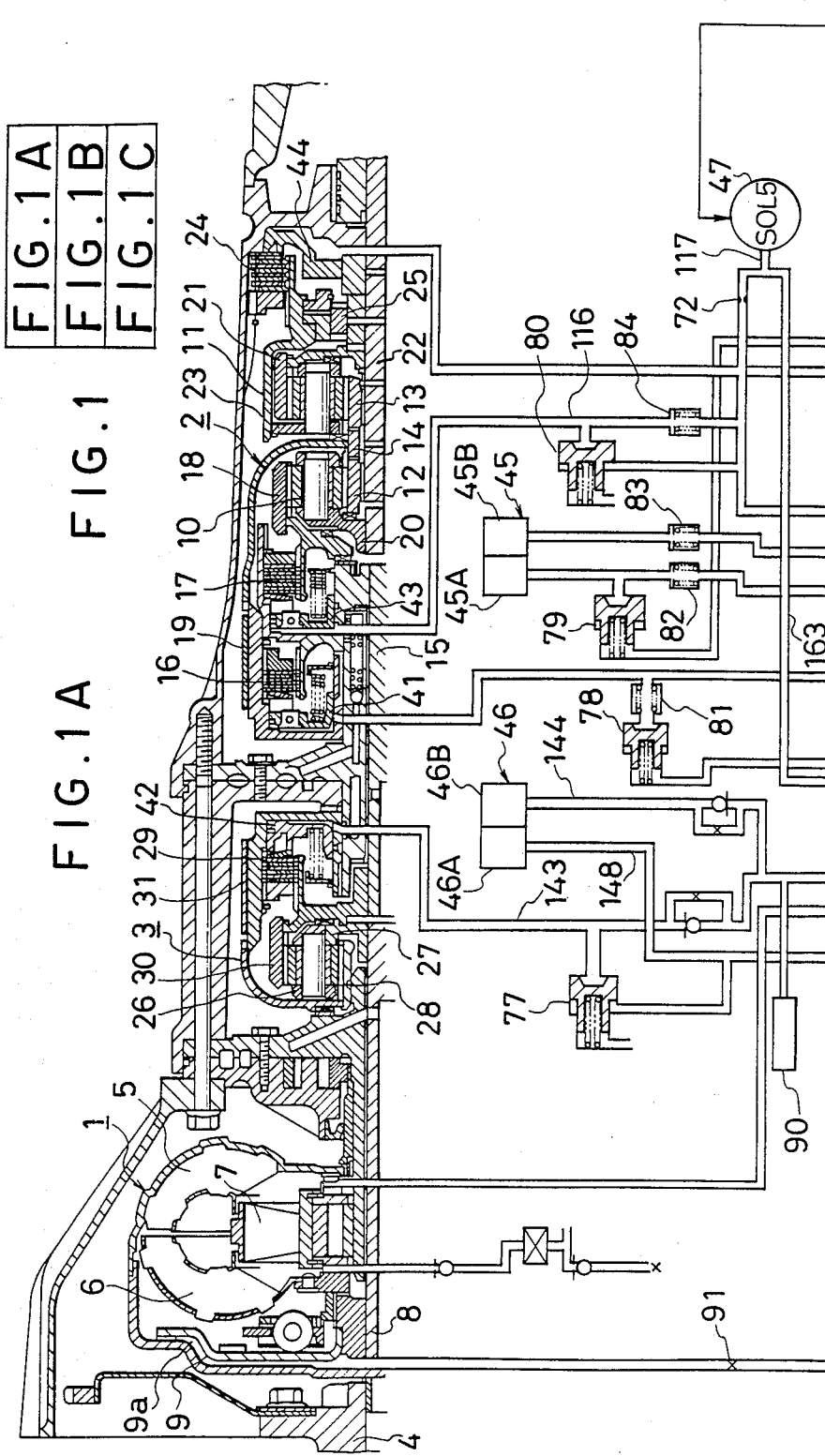

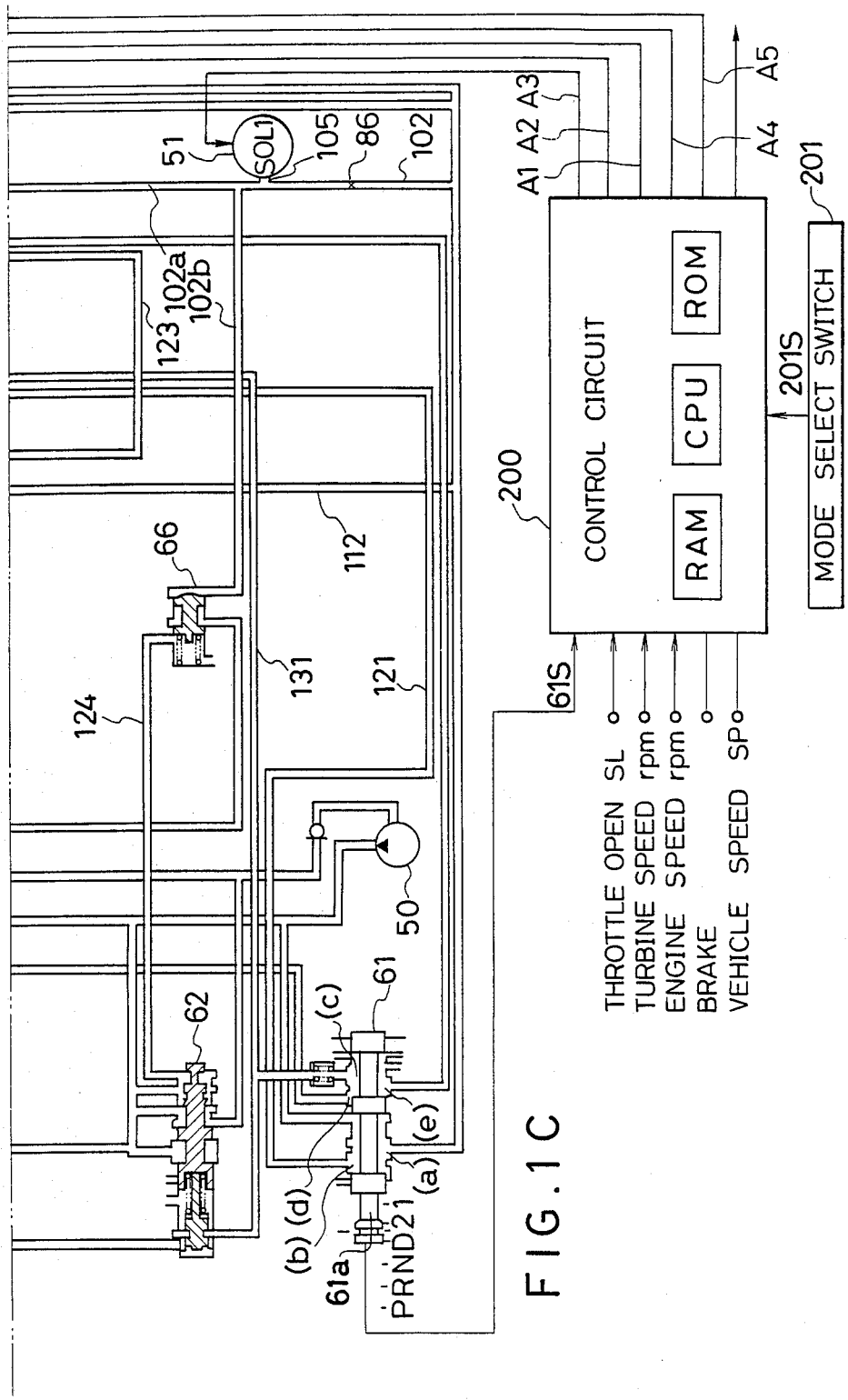

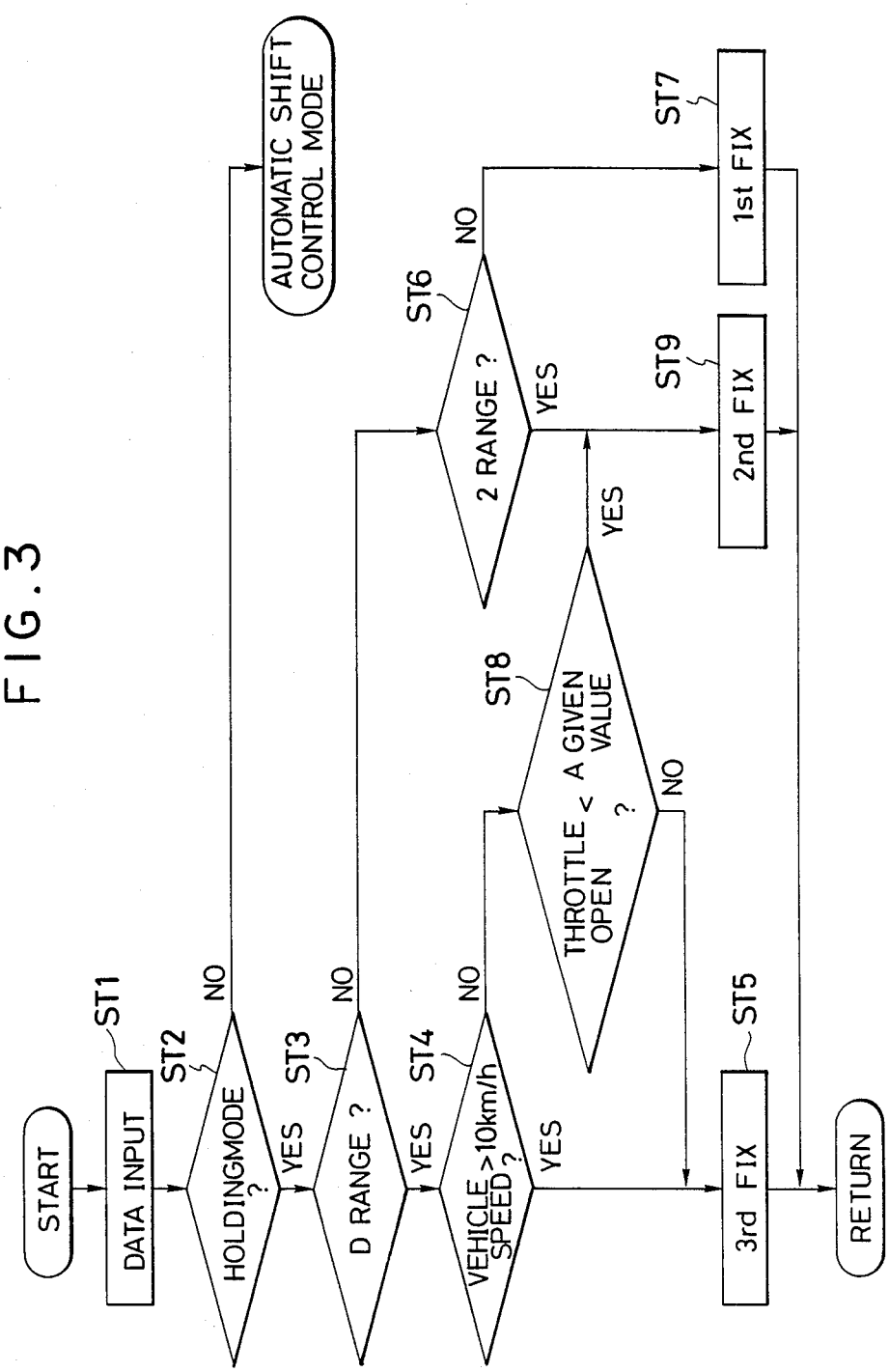

AUTOMATIC TRANSMISSION SYSTEM FOR A VEHICLE

BACKGROUND OF THE INVENTION

1. Field of the Invention

The present invention relates to a vehicle automatic transmission, and more particularly to a control system of a vehicle automatic transmission having a multiple stage transmission gear mechanism connected with a torque converter.

2. Description of the Prior Art

Conventional vehicle automatic transmissions having a multiple stage transmission gear mechanism connected to a torque converter are adapted to automatically select one of the gear stages of the transmission gear mechanism in accordance with vehicle operating conditions so that start and shift operations can be obtained automatically. There is known an automatic transmission further including means for determining a vehicle drive property in accordance with a driver command in addition to the automatic shift control mode. An example of such an automatic transmission is shown in Japanese Patent Publication No. 48-210 for public opposition on Jan. 6, 1973. In this automatic transmission, there is provided a holding mode as a shift control mode wherein the transmission in is maintained at a predetermined gear stage irrespective of the driving condition of the vehicle when the driver selects the holding mode so that the vehicle can drive in accordance with the driver's commands.

In such an automatic transmission provided with a holding mode for the vehicle shift control in addition to the automatic shift control mode, a shift down operation is not made where the holding mode is selected even when the vehicle speed is reduced and an unloaded engine condition is produced. As a result, when an higher gear stage, such as the third stage of the D-range is selected, a restart operation is carried out under such higher gear stage after the idling condition has occurred so that a desirable acceleration speed cannot be obtained. Further, when the vehicle runs up hill, it is apt to reverse undesirably because of the lack of drive torque.

SUMMARY OF THE INVENTION

It is therefore an object of the present invention to provide a control system for a vehicle automatic transmission which includes a holding shift control mode as well as an automatic shift control mode so as to provide a desirable drive property even when a higher gear stage is selected under the holding mode.

It is another object of the present invention to provide a control system which provides a vehicle with a sufficient drive torque in up-hill driving at the time of restart condition where the holding mode is selected.

According to the present invention, in order to accomplish the above and other objects, a control system for automatic transmissions includes a multiple stage transmission gear mechanism having a plurality of gear stages of different gear ratios, changing means for changing a power transmitting mechanism so as to select one of the gear stages of the multiple stage transmission gear mechanism, drive condition detecting means for detecting drive conditions of the vehicle, a movable member capable of locating at a plurality of positions corresponding to the respective gear stages in plural shift ranges, gear stage selecting means for moving said movable member to thereby select one of the gear stages in the shift ranges, mode selecting means for selecting a holding mode wherein the gear stage is maintained at a predetermined gear stage, control means for controlling said changing means based on a shift control map in accordance with a shift range selected by the gear stage selecting means when said holding mode is not selected and in accordance with a gear stage selected by the gear stage selecting means when said holding mode is selected characterized in that said control means comprises drive condition detecting means for detecting a predetermined drive condition of the vehicle, and shift down control means for selecting a lower gear stage than the gear stage selected by the gear stage selecting means when said predetermined drive condition is detected under said holding mode.

According to the present invention, in the case where the holding mode is selected, when the vehicle speed is lower than a predetermined value and/or the engine load is lower than a predetermined value, such as in the idling condition, a lower gear stage than one selected by the gear stage selecting means is selected so that desirable drive torque can be obtained to cause the vehicle to restart and accelerate smoothly.

The above and other objects and features of the present invention will become apparent from the following description of preferred embodiments made with reference to the accompanying drawings.

BRIEF DESCRIPTION OF THE DRAWINGS

Composite FIGS. 1A–1C is a diagrammatic illustration of a vehicle automatic transmission in accordance with one embodiment of the present invention;

FIG. 3 is a flow chart of shift down control in accordance with another embodiment of the present invention.

DESCRIPTION OF THE PREFERRED EMBODIMENTS

Basic Structure of the Transmission

Figure 1B:
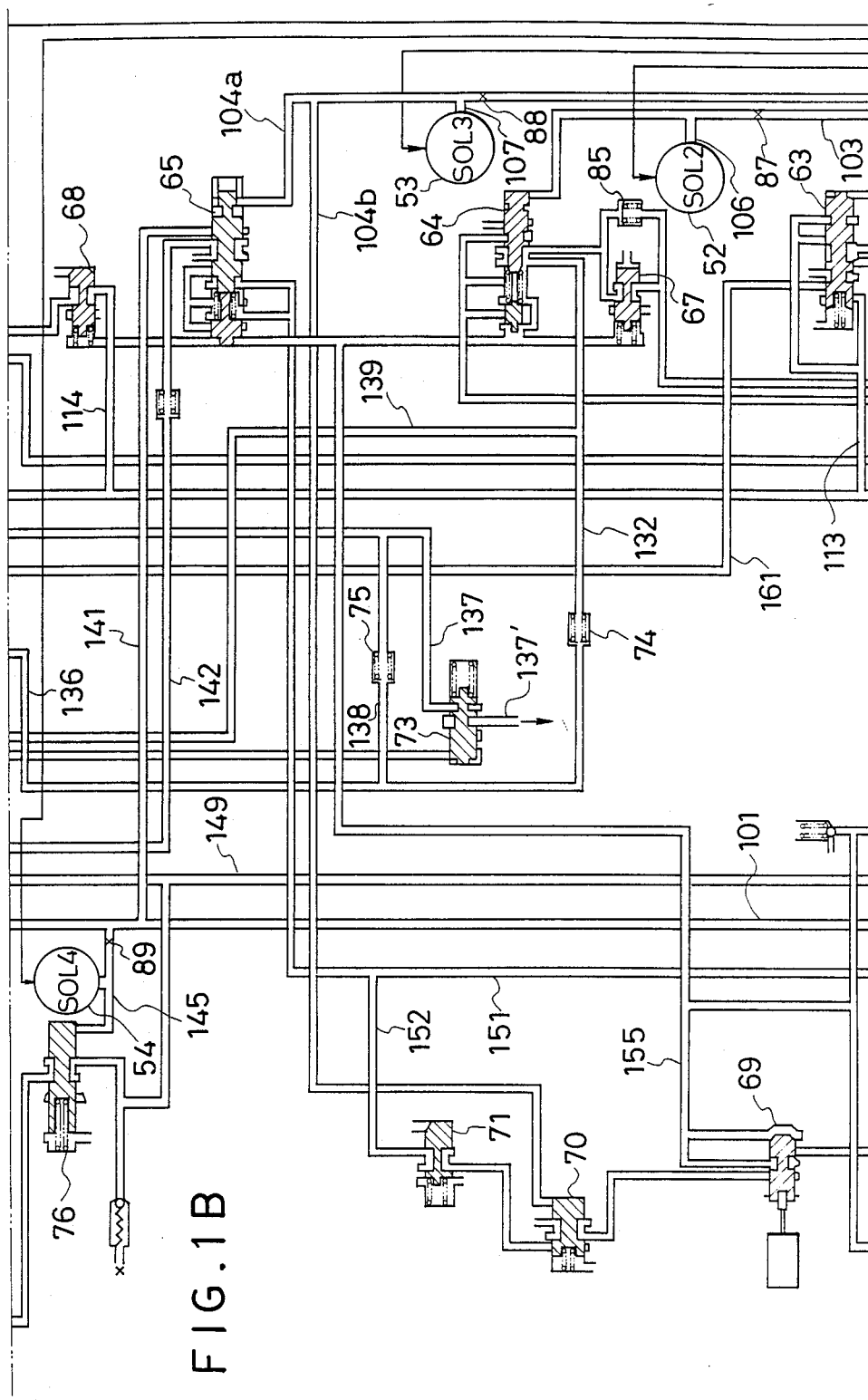

Referring now to FIG. 1, there is shown an automatic transmission which comprises a hydraulic torque converter 1, a multiple stage transmission gear mechanism 2, and a planetary gear type over-drive transmission mechanism 3 arranged between the torque converter 1 and the multiple stage transmission gear mechanism 2.

The torque converter 1 has a pump 5 connected with an engine output shaft 4, a turbine 6 provided to face the pump 5 and a stator 7 disposed between the pump 5 and the turbine 6. A converter output shaft 8 is connected with the turbine 6. A lock-up clutch 9 is provided between the converter output shaft 8 and the casing which is connected to the pump 5. The lock-up clutch 9 is normally engaged with the casing under the pressure of hydraulic fluid which circulates in the torque converter 1, and is released by hydraulic pressure, which is drawn to a space between the casing and the clutch 9 from an external pressure source.

The multiple stage transmission gear mechanism 2 has a front planetary gear unit 10 and a rear planetary gear unit 11. The front planetary gear unit 10 has a sun gear 12 connected with a sun gear 13 of the rear planetary gear unit 11 though a connection rod 14. The gear mechanism 2 has an input shaft 15 connected through a front clutch 16 with the connecting rod 14 and through a rear clutch 17 with an internal gear 18 of the front planetary gear unit 10. A second brake 31 is provided between the connecting rod 14 or the sun gears 12, 13 of the gear units 10 and 11 and a casing of the transmission. The gear mechanism 2 also has an output shaft 22 connected with a planetary carrier 20 of the front planetary gear unit 10 and an internal gear 21 of the rear planetary gear unit 11. The rear planetary gear unit 11 has a planetary carrier 23, and there are provided between the planetary carrier 23 and the transmission casing a low-reverse brake 24 and a one-way clutch 25.

The planetary gear type over-drive transmission mechanism 3 includes planetary gears 26, a planetary carrier 27 rotatably carrying the planetary gears 26 and connected with the output shaft 8 of the torque converter 1, a sun gear 28 engaged with the planetary gears 26, and an internal gear 30 which is also engaged with the planetary gears 26 and connected with the sun gear 28 through a direct connecting clutch 29. An over-drive brake 31 is provided between the sun gear 28 and the transmission casing. The internal gear 30 is connected with the input shaft 15 of the multiple stage transmission gear mechanism 2.

The multiple stage transmission gear mechanism 20 is of a known type and can provide three forward driving gear stages and one reverse stage through selective engagements of the clutches and brakes. The relationships between the forward gear stages and the engagements of the clutches and brakes are shown in Table 1 together with typical values of gear ratios in the gear stages. The planetary gear type over-drive transmission mechanism 3 connects the shafts 8 and 15 directly when the direct connection clutch 29 is engaged and the brake 31 is released, and provides an over-drive connection between the shafts 8 and 15 when the brake 31 is engaged and the clutch 29 is released. This function is also shown in Table 1 together with typical values of the gear ratios.

when the plunger is in one of the positions D, 2 and 1. The port b communicates with the pressure line 101 in one of the positions D and 2. The port c is communicated with the pressure line 101 in the position R. The port d communicates with the pressure line 101 in one of the positions P, R, 2 and 1. The port e communicates with the pressure line 101 in one of the positions R and 1.

The port a is further connected with a line 111 which is branched at an end portion into a first pilot line 102, a second pilot line 103 and a third pilot line 104. The line 102 is provided with a 1-2 shift solenoid valve 51 for controlling the operation of a 1-2 shift valve 63 and a flow restriction 86. The line 103 is provided with a 2-3 shift solenoid valve 52 for controlling the operation of a 2-3 shift valve 64 and a flow restriction 87. The line 104 is provided with a 3-4 shift solenoid valve 53 for controlling the operation of 3-4 shift valve 65 and a flow restriction 88. The solenoid valves 51, 52 and 53 function to close drain lines 105, 106 and 107 for the lines 102, 103 and 104, respectively, when energized to produce pilot pressures in the respective lines 102, 103 and 104. The pressures in the lines 102, 103 and 104 function to move the shift valves 63, 64 and 65 from right positions to left positions to effect shift operations. The relationship between the shift positions and the operations of the shift solenoid valves are shown in Table 2.

TABLE 2

| GEAR STAGE | 1-2 SHIFT SOLENOID VALVE | 2-3 SHIFT SOLENOID VALVE | 3-4 SHIFT SOLENOID VALVE |
|---|---|---|---|
| 1 | OFF | OFF | OFF(ON) |
| 2 | ON | OFF | OFF(ON) |
| 3 | ON | ON | OFF |
| 4 | ON | ON | ON |

It will be noted herein that the 3-4 shift solenoid valve 59 is deenergized in the 1st and 2nd stages under

TABLE 1

| SHIFT RANGES | | REAR CLUTCH (17) | FRONT CLUTCH (16) | LOCK-UP CLUTCH (9) | DIRECT CLUTCH (29) | LOW-REVERSE BRAKE (24) | SECOND BRAKE (19) | OVERDRIVE BRAKE (31) | ONE-WAY CLUTCH (25) |
|---|---|---|---|---|---|---|---|---|---|
| P | | | | | O | | | | |
| R | | | O | | O | O | | | |
| N | | | | | O | | | | |
| D | 1st | O | | | O | | | | O |
|  | 2nd | O | | O | O | | O | | |
|  | 3rd | O | O | O | O | | | | |
|  | 4th | O | O | O | | | | O | |
| 2 | | O | | | O | | O | | |
| 1 | 1st | O | | | O | O | | | |
|  | 2nd | O | | | O | | O | | |

HYDRAULIC CONTROL CIRCUIT

The above-mentioned automatic transmission is provided with a hydraulic control circuit as shown in FIG. 1. The hydraulic control circuit has an oil pump 50 which is driven by the engine output shaft. Hydraulic oil is discharged under pressure from the pump 50 into a pressure line 101. The oil pressure is reduced by a pressure regulating valve 62 and applied to a select valve 61. The select valve 61 has a plunger which can be selectively positioned by means of a shift lever in one of the shift positions 1, 2, D, N, R and P.

The manual valve 61 includes five ports a, b, c, d and e. The port a is communicated with the pressure line 101 the D-range, however, it is energized in the 1st and 2nd stages under the 1 and 2-ranges as shown in brackets in the Table 2. This is because in the 1 and 2-range the pilot pressure is applied to the back-up control valve 70 from the 3-4 shift solenoid valve 59 as described later.

The first pilot line 102 is branched at a portion downstream the 1-2 shift solenoid valve 51 into a first branch line 102a which leads to a right end portion of the 1-2 shift valve 63 and a second branch line 102b which leads to a right end portion of a cut back valve 66.

The 1-2 shift valve 63 is applied at the opposite end portions with the line pressure through a line 112 branched from the line 111 and a line 113 branched further from the line 112. Further, the 1-2 shift valve 63 is applied at an intermediate portion with the line pressure through a line 122 which is in communication with the port e of the select valve 61. The line 122 is communicated with a line 123 when the 1-2 shift valve 63 is in the deenergized position, that is, in the 1st gear stage. The line 123 is connected with an actuator 44 for the low-reverse brake 24.

The line 113 is connected with a line 161 when the 1-2 shift valve 63 is energized, that is, in a gear stage other than the 1st stage. The line 161 is connected with an actuator 45 for the second brake 19. The actuator 45 includes a piston, not shown, connected through a piston rod with the brake band of the second brake 19. The piston defines a brake applying chamber 45a and a brake releasing chamber 45b at the opposite sides thereof and biased into a brake releasing direction by a spring. The line 161 is opened to the brake applying chamber 45a of the actuator 45. The line 161 is provided with an accumulator 79 and a one-way orifice 82. The back pressure of the accumulator 79 is controlled by a reducing valve 68.

The 2-3 shift valve 64 is operated by the pilot pressure introduced into the right end portion thereof through the line 103. The 2-3 shift valve 64 is connected with a line 121 leading from the port b of the manual valve 61 and with a line 131 leading from the port c of the manual valve 61.

The line 121 is communicated with a line 132 in the energized position of the 2-3 shift valve 64, that is, in the 3rd and 4th gear stages. The line 131 is communicated with the line 132 in the deenergized position of the 2-3 shift valve 64, that is, in the 1st and 2nd gear stages. The line 131 is provided with a reducing valve 67 and a one-way orifice 85 which are parallel with each other.

The line 132 is branched into a line 136 which is connected with an actuator 41 for the front clutch 16 and a line 138 which is connected with the releasing chamber 45b of the actuator 45 for the second brake 19. The line 132 is provided at a portion upstream the branched portion with a one-way orifice 74 which functions to apply a flow restriction to the flow directed to the branched portion.

The line 138 is provided at a portion immediately downstream the branched portion with a check valve 75 which functions to block the flow from the actuator 45 to the 2-3 shift valve 64. The line 138 is connected at a portion downstream the check valve 75 with a line 137 which is provided with a 3-2 timing valve 73.

The 3-2 timing valve 73 is adapted to be applied at a left end portion with a pilot pressure under which the spool of the valve 73 is shifted rightward to connect with line to a drain passage 137'. The pilot pressure chamber at the left end portion of the valve 73 is connected through a line 163 with the line 112. A flow restriction 72 is provided at the junction between the line 112 and the line 163. A drain line 117 is connected with the line 163 between the timing valve 73 and the flow restriction 72. The drain line 117 is provided with a solenoid valve 47 which is closed when energized to establish the pilot pressure in the line 163. The line 138 is provided at a portion downstream the junction between the lines 137 and 138 with a one-way orifice 83.

The line 136 is connected through a one-way orifice 81 with an accumulator 78 which is applied with a back pressure through a line branched from the line 132. The one-way orifice 81 functions to restrict the flow from the accumulator 78. The back pressure to the accumulator 78 is controlled by the aforementioned reducing valve 67.

The third pilot line 104 is branched at a portion downstream the 3-4 shift solenoid valve 53 into a first branch line 104a leading to a right end portion of the 3-4 shift valve 65 and a second branch line 104b leading to a pilot port of a back-up control valve which will be described later.

The 3-4 shift valve 65 is connected at an intermediate portion with a line 141 branched from the pressure line 101. The line 141 is connected with a line 142 in an unshifted position of the 3-4 shift valve 65, that is, in the gear stages other than the 4th stage. The line 142 is branched into a line 143 leading to an actuator 42 for the direct clutch 29 and a line 144 connected with an actuator 46 for the overdrive brake 31 at a brake releasing chamber 46B. A pressure switch 90 is provided in the line 142 at a portion upstream the branched portion. The line 143 is provided with an accumulator 77. The actuator 46 for the overdrive brake 46 has a brake engaging chamber 46A which is connected with the pressure line 101 through a line 148.

The 3-4 shift valve 65 is connected at a left end portion with a line 151 which is connected with the port d of the manual valve 61 so that the spool of the 3-4 shift valve 65 is maintained in the unshifted position in th select range other than the D-range by the line pressure introduced to the 3-4 shift valve 65 through the line 151. A line 152 is branched from the line 151 to lead to a vacuum throttle valve 69. The line 152 is provided with a throttle back-up valve 71 and a back-up control valve 70 which are arranged in series so that the valve 70 is in the upstream side.

The throttle back-up valve 71 functions to apply the line pressure in the line 152 to the vacuum throttle valve 69 in the 2 and 1 range to drive the pressure regulating valve 62 to increase the line pressure. The back-up control valve 70 is located between the throttle back-up valve 71 and the vacuum throttle valve 69 and functions to open the line 152 when a pressure is built up in the line 104b, that is, when the 3-4 shift solenoid valve 53 is energized. When the line 152 is opened in this manner, it becomes possible to increase the line pressure by the throttle back-up valve 71.

The line 112 is connected at a portion upstream the restriction 72 with a line 116 leading to an actuator 43 for the rear clutch 17. The line 116 is provided with an accumulator 80 and a one-way orifice 84. A line 114 is branched from the line 112 and provided with a reducing valve 68 for regulating the back pressure to the accumulator 79. The line 149 is connected with an actuating chamber 9a of the lock-up clutch through a line 146 provided with a lock-up valve 76 and a flow restriction 91. The lock-up valve 76 has a pilot line 145 provided with a flow restriction 89 and a lock-up solenoid valve 54. The lock-up clutch 9 is released when the lock-up solenoid valve 54 is energized to establish a pilot pressure in the line 145 to thereby move the spool of the lock-up valve 76 to a position wherein the lines 146 and 149 are connected together. In the illustrated embodiment, the lock-up clutch is engaged only in the 1st through 3rd gear stages.

CONTROL CIRCUIT

In order to make the aforementioned hydraulic circuit operate in an appropriate manner, there is provided an electronic control circuit 200 which may be made of a microprocessor having an I/O, RAM, ROM and CPU as well known in the art. The control circuit 200 is arranged to receive signals representing various vehicle operating conditions, such as throttle valve position signal SL, vehicle speed signal SP, a torque converter turbine speed from a speed detector provided on the torque converter output shaft, engine rotation speed, and ON-OFF of the brakes. The CPU further receives signal 61s from the manual valve 61 denoting a shift range (P,R,N, 2 or 1) where the valve spool 61a is located.

The CPU functions to judge the vehicle operating condition from these input signals and determines a gear stage in accordance with above signals denoting vehicle drive condition and a control map memorized in ROM thereof to produce appropriate output signals $A_1$, $A_2$, $A_3$, $A_4$ and $A_5$ which are applied to the solenoid valves 51, 52, 53, 54 and 47 in the hydraulic circuit.

In this embodiment, there is provided a mode selecting switch 201 which is adapted to select one of two control modes as shown in Table 3.

TABLE 3

| MODE | RANGE | | |
|---|---|---|---|
| | D | 2 | 1 |
| AUTOMATIC CONTROL MODE | 1st–4th | 1st–3rd | 1st–2nd |
| HOLDING MODE | 3rd Fix | 2nd Fix | 1st Fix |

When the automatic control mode is selected, one of first through fourth gear stages is selected in the D-range. One of first through third gear stages in 2-range ,first or second gear stages in 1-range is selected respectively.

On the other hand, when the holding mode is selected, the gear stage is fixed at the third stage in D-range, the second stage in 2-range , and the first stage in 1-range, respectively.

Figure 2:
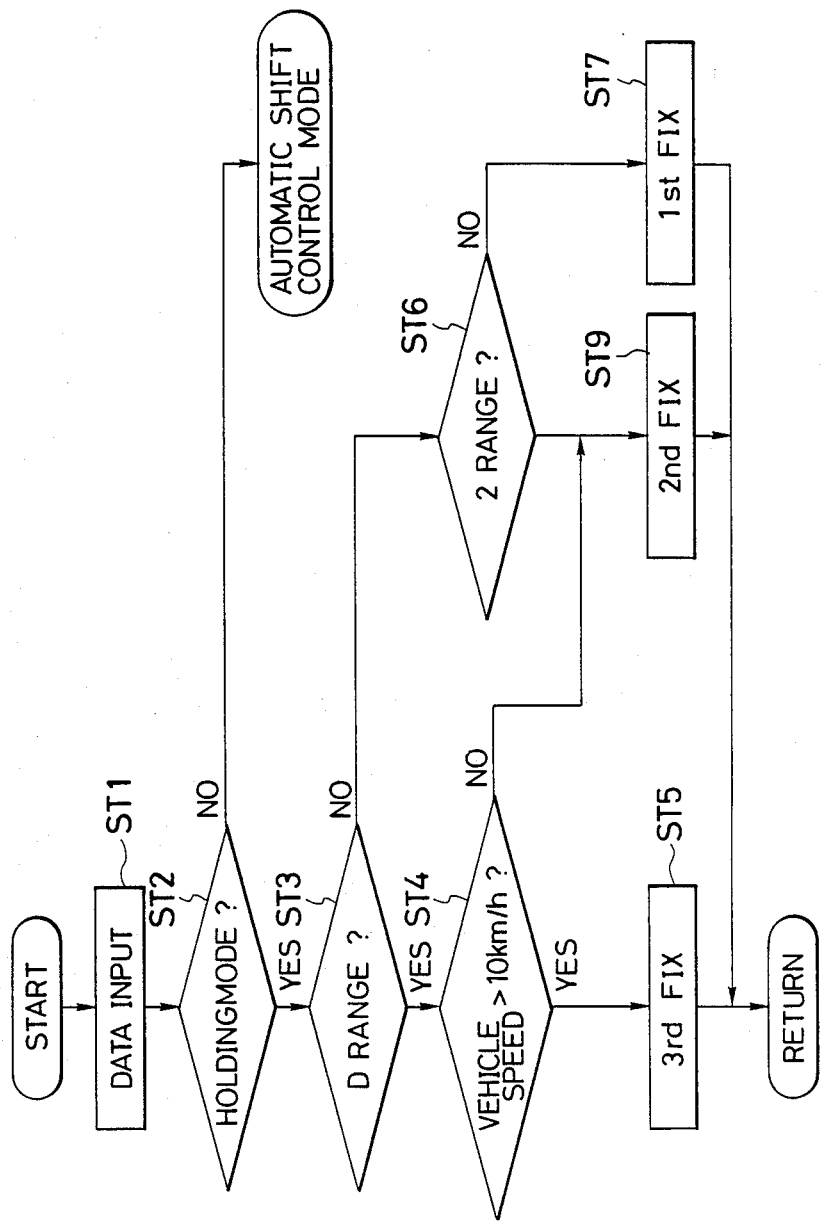
FIG. 2 is a flow chart of shift down control in accordance with one embodiment of the present invention.

There is described hereinafter an example of the shift down control with reference with FIG. 2.

At first, the signals denoting engine drive condition (vehicle speed SP, throttle valve opening SL and the like ) are read. Further, signal 201S from the switch 201 and signal 1S from the manual valve 61 are read in step ST1. In step ST2, The CPU judges whether or not the holding mode is selected. If the holding mode is selected, step ST3 is carried out. In the step ST3, The CPU judges whether or not the manual valve is located at D-range. If the judgment is YES, step ST4 is carried out. In the case where the vehicle speed exceeds 10 km/h, step ST5 is carried out so that the gear stage is fixed at the third stage. That is, in the step ST5, the CPU outputs control signals $A_1$ through $A_5$ to turn the 1-2 and 2-3 solenoids on and the 3-4 solenoid off. On the other hand, in the case where the holding mode is selected, when the manual valve 61 is in the 2-range, step ST2, ST3, ST6 and ST9 are carried out in order so that the gear stage is fixed at the second stage. When the manual valve 61 is in the 1-range, step ST2, ST3, ST6, and ST7 are carried out in order to fix the gear stage at the first stage.

In this control, since the vehicle speed is less than 10 km/h, the second stage is selected rather than the third stage so that the shift down control is accomplished. In the case where the manual valve is located in the D-range, when the vehicle speed exceeds 10 km/h again, the step ST4, ST5 or ST4, ST8, ST5 are carried out so that the gear stage is fixed at the third stage.

On the other hand, when the automatic control mode is selected, the shift control is carried out automatically in accordance with the map in the CPU.

In this control, when the vehicle speed is lower than the predetermined value, the shift down control is carried out even when a higher gear stage is selected in the holding mode. It will therefore be understood that since the higher gear stage is not selected in the restart or reacceleration operations of the vehicle, a desirable acceleration feeling can be obtained, and reverse movement of the vehicle can be avoided in up-hill driving.

Referring to FIG. 3, there is shown another example of shift down control in accordance with the present invention. In this control, in the case that the manual valve 61 is in the D-range, when the vehicle speed is less than 10 km/h, the CPU judges whether or not the engine is in the idling condition in step ST8. When the throttle valve opening is less than a predetermined value, the CPU judges that the engine is in the idling condition. In this case, the CPU carries out the step ST9 so that the gear stage is fixed at the second stage. That is, the shift down control is accomplished. By this control, a sufficient drive torque can be obtained in a restart operation under the holding mode. When the vehicle is not in the idling condition, that is, the throttle valve is opened more than a predetermined position, the gear stage is shifted up to a higher stage. It will therefore be understood that the vehicle can restart smoothly even on a snow-covered road.

I claim:

1. An automatic transmission system for a vehicle which includes a multiple stage transmission gear mechanism having a plurality of gear stages with respectively different gear ratios, range selecting means for manually selecting one of a plurality of transmission gear mechanism operating ranges of gear stages in which at least one of said gear stages is selected by said transmission gear mechanism, each operating range including at least a highest and a lowest gear stage, the highest gear stage of one of said operating ranges being higher than those of the other operating ranges, a control circuit and switching means for shifting the gear mechanism between the respective stages in a selected operating range, drive condition detecting means for providing signals representative of a driving condition to said control circuit, mode selecting means for selectively placing the system in an automatic mode and a holding mode, said control circuit including control means for determining which mode has been selected, the switching means controlled by said control means in the automatic mode automatically to change gears in accordance with a first shift map using predetermined variable parameters derived from detected driving conditions, and the switching means controlled by said control means in the holding mode to retain the transmission in a gear stage which is lower than the highest gear stage in each of said plurality of operating ranges and different in each of said operating ranges, and to automatically downshift the transmission to a lower stage only when the holding mode is selected, the vehicle speed is less than a predetermined value, and the operating range having the highest of said plurality of gear stages is selected by said range selecting means, downshift from said lower stage being prohibited, said lower stage being higher than at least one other gear stage.

2. A system in accordance with claim 1 wherein the operating ranges comprise a D-range having first, second, third and fourth gear stages, a 2-range having the first, second and third gear stages, a 1-range having the first gear stage, and wherein the holding mode provides for retention of the transmission in the third stage for the D-range, in the second stage for the 2-range, and in the first stage for the 1-range, respectively.

3. A system in accordance with claim 2 in which the holding mode provides for down shift from the third stage to the second stage in the D-range.

4. A system in accordance with claim 1 in which the first shift map provides a shift control common to respective shift ranges selected by the range selecting means.

5. A control system in accordance with claim 1 in which said predetermined vehicle speed is approximately 10 km/h.

6. An automatic transmission system for a vehicle, including
    a multiple stage transmission gear mechanism having a plurality of gear stages of different gear ratios,
    switching means for switching a power transmitting mechanism so that one of the gear stages of the multiple stage transmission gear mechanism is selected,
    drive condition detecting means for detecting drive conditions of the vehicle,
    range selecting means for selecting one of a plurality of transmission gear mechanism operating ranges of gear stages in which at least one of said gear stages is selected by said transmission gear mechanism, each operating range including at least a highest and a lowest gear stage, the highest gear stage of one of said operating ranges being higher than those of other operating ranges,
    mode selecting means for selecting an automatic mode or a holding mode,
    control means for controlling said switching means so that when said automatic mode is selected, said switching means is controlled by said control means automatically to change gears in accordance with a shift control map using predetermined variable parameters derived from detected driving conditions, the control means being provided with idling detecting means for detecting an idling condition of an engine in which the vehicle speed is lower than a predetermined value and an engine load is lower than a predetermined value, said switching means being controlled by said control means in said holding mode to retain the transmission system in a gear stage which is lower than the highest gear stage in each of said plurality of operating ranges and different in each of said operating ranges, and to carry out a shift down action to select a lower gear stage in the transmission system only when the holding mode is selected, the vehicle speed is less than a predetermined value, said idling condition is detected, and the operating range having the highest of said plurality of gear stages is selected by said range selecting means, downshift from said lower gear stage being prohibited, said lower gear stage being higher than at least one other gear stage.

7. A method of controlling an automatic transmission system for a vehicle which includes a multiple stage transmission gear mechanism having a plurality of gear stages with respectively different gear ratios, comprising the steps of:
    manually selecting one of a plurality of transmission gear mechanism operating ranges of gear stages in which at least one of said gear stages is selected by said transmission gear mechanism, each operating range including at least a highest and a lowest gear stage, the highest gear stage of one of said operating ranges being higher than those of the other operating ranges,
    shifting the gear mechanism between the respective stages in a selected operating range,
    providing signals representative of a driving condition to said control circuit,
    selectively placing the system in an automatic mode and a holding mode,
    determining which mode has been selected,
    automatically changing gears in accordance with a first shift map using predetermined variable parameters derived from detected driving conditions when the system is in the automatic mode,
    retaining the transmission in a gear stage which is lower than the highest gear stage in each of said plurality of operating ranges and different in each of said operating ranges, and automatically downshifting the transmission to a lower stage higher than at least one other gear stage and prohibiting downshift from said lower stage only when the vehicle speed is less than a predetermined value and the operating range having the highest of said plurality of gear stages is selected by said range selecting means, when said system is in the holding mode.

* * * * *